United States Patent
Heim et al.

(10) Patent No.: US 7,465,138 B2
(45) Date of Patent: Dec. 16, 2008

(54) UNDULATING WASHER OR WAVE-SHAPED SPRING WITH A DEFINED PROGRESSIVE CHARACTERISTIC SPRING RATE

(75) Inventors: Alexander Heim, Tettnang (DE); Andreas Rinsdorf, Frendenberg (DE)

(73) Assignee: Muhr und Bender KG, Attendorn (DE)

( * ) Notice: Subject to any disclaimer, the term of this patent is extended or adjusted under 35 U.S.C. 154(b) by 25 days.

(21) Appl. No.: 11/107,043

(22) Filed: Apr. 15, 2005

(65) Prior Publication Data

US 2005/0271497 A1  Dec. 8, 2005

(30) Foreign Application Priority Data

Apr. 17, 2004  (DE) .................. 10 2004 018 711

(51) Int. Cl.
*F16B 43/00* (2006.01)

(52) U.S. Cl. .................. 411/544; 411/154; 267/161

(58) Field of Classification Search .................. 411/544, 411/149, 150, 154; 267/161, 162
See application file for complete search history.

(56) References Cited

U.S. PATENT DOCUMENTS

| | | | | |
|---|---|---|---|---|
| 330,492 A | * | 11/1885 | Johnson | 411/149 |
| 1,362,975 A | * | 12/1920 | Whitcomb | 401/82 |
| 1,427,194 A | * | 8/1922 | Cochrane | 411/157 |
| 1,773,286 A | * | 8/1930 | Stanford | 411/154 |
| 1,850,242 A | * | 3/1932 | Olson | 411/165 |
| 3,631,910 A | * | 1/1972 | Crowther et al. | 411/149 |
| 3,992,974 A | * | 11/1976 | Miki et al. | 411/544 |
| 4,897,006 A | * | 1/1990 | Blin | 411/368 |
| 5,622,358 A | * | 4/1997 | Komura et al. | 267/166 |
| 6,669,184 B2 | * | 12/2003 | Cai et al. | 267/162 |
| 6,758,465 B1 | * | 7/2004 | Greenhill et al. | 267/166 |

FOREIGN PATENT DOCUMENTS

| | | |
|---|---|---|
| DE | 26 00 946 A1 | 7/1977 |
| JP | 07-248035 A | 9/1995 |
| JP | 09 032 874 | 2/1997 |
| JP | 09-032874 A | 2/1997 |
| JP | 103 21 800 A1 | 12/1998 |
| JP | 11 270 605 | 10/1999 |

\* cited by examiner

*Primary Examiner*—Flemming Saether

(57) ABSTRACT

An axially acting undulating washer or wave-shaped spring consisting of a closed annular member which comprises a central X-axis and which is periodically wave-shaped across the circumference, wherein a wave line extends so as to monotonically rise or fall between a plurality of identical minima and identical maxima and wherein in the minima and maximum of the wave line there are formed contact points of the annular member relative to axis-normal contact faces, wherein, starting from each minimum and maximum, the annular member, on both sides, i.e. in each circumferential direction, comprises at least two wave line portions which directly adjoin one another and which, with an increasing axial load, are individually flattened and made to contact and contact faces one after the other.

12 Claims, 4 Drawing Sheets a) calculated theoretical characteristic
b) measured characteristic of a real part

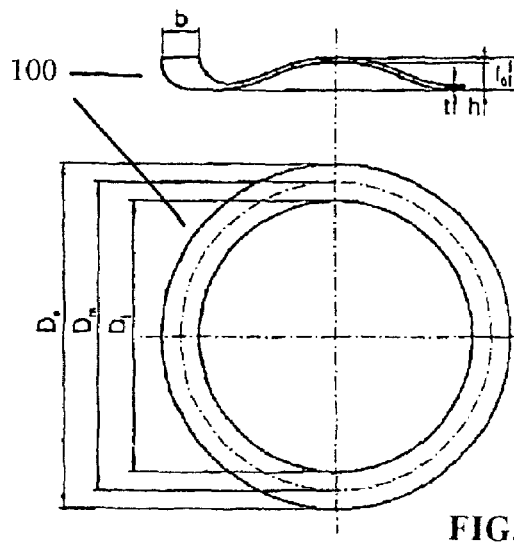
FIG. 3a
- $D_a$ : outer diameter
- $D_m$ : average diameter
- $D_i$ : inner diameter
- $t$ : thickness
- $b$ : width
- $l_0$ : spring height
- $h$ : wave height
- $n$ : number of wave
FIG. 3b
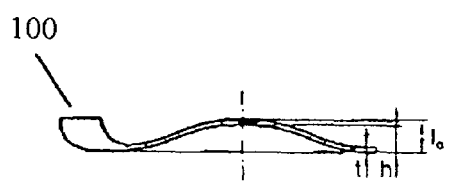
FIG. 4a
- $t$ : thickness
- $l_0$ : spring height
- $h_1$ : travel in 1st portion of characteristic
- $h_2$ : travel in 2nd portion of characteristic
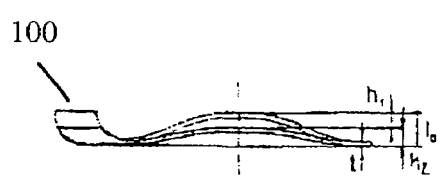
FIG. 4b
FIG. 4c

UNDULATING WASHER OR WAVE-SHAPED SPRING WITH A DEFINED PROGRESSIVE CHARACTERISTIC SPRING RATE

The invention relates to an axially acting, undulating washer or wave-shaped spring consisting of a closed annular member which comprises a central X-axis and which periodically undulates across the circumference. The closed annular member has a wave line that extends between a plurality of identical minima and identical maxima. When unloaded the minima and maxima of the wave line form contact points of the annular member relative to axis-normal contact faces and, between the contact points contact-free wave line ranges are provided. Undulating washers or wave-shaped springs according to the state of the art comprise a linear or continuously progressive characteristic spring rate which is predetermined by an approximately sinusoidal extension of the wave line if viewed across the circumference. Such a linear or continuously progressive spring rate is unsuitable for certain applications. Also, the spring rate of such wave-shaped springs in absolute terms is inadequate for some applications.

From the applicant's earlier non-published German patent application 103 21.800.9, an washer or wave-shaped spring is described whose characteristic spring rate progresses stepwise. However, across its circumference, the spring comprises a wave line extension with absolute and relative minima and maxima of different magnitudes and thus refers to a different type.

It is therefore an object of the present invention to provide an undulating washer or wave-shaped spring of the initially mentioned type having a characteristic spring curve which increases stepwise.

The objective is achieved in that, starting from each minimum and maximum, the annular member, on both sides, i.e. in each circumferential direction, comprises at least two wave line portions which directly adjoin one another. With an increasing axial load on the annular member, the at least two wave line portions become individually flattened and are made to contact the contact faces one after the other.

More particularly, it is proposed that, with an increasing axial load, the contact points of the annular member relative to the contact faces lying at the ends of the contact-free wave line ranges, move away from the original minima and maxima discontinuously, i.e., stepwise.

Furthermore, the objective is achieved in that, starting from each minimum and maximum, the annular member, on both sides, i.e. in each circumferential direction, comprises at least two wave line portions which directly adjoin one another. The at least two wave line portions correspond to the curved lines of bending beams loaded at their free ends by an individual load, wherein the curved lines of the individual wave line portions are based on individual loads which increase with an increasing distance from the original minima and maxima.

This means that the single wave line portions are designed like the curved lines of bending beams, clamped in at their one end and loaded by an individual load at their other free end. For the purposes of calculation of these curved lines defining the wave line portions, a fictive individual load can be provided which increases from one wave line portion to the next one, when used in practice, an annular member can be loaded with a corresponding individual load at one of the contact points, the adjoining wave line portion comes to form a straight line, so that the respective wave line portion as a whole flatly contacts one of the contact faces.

Alternatively the objective is achieved in that the annular member is so designed that, at compression in direction of the X-axis under an increasing axial load, at least two adjoining ranges of travel $h_1$, $h_2$ are provided, the spring rates $r_1$, $r_2$ of which are each constant, and increase from one to the next with an increasing path of travel ($r_2 > r_1$).

Furthermore the objective is achieved in that, starting from each minimum and maximum, the annular member-comprises at least two wave line portions $\phi_1$, $\phi_2$ in each circumferential direction. The at least two wave line portions can directly adjoin one another and have a constant gradient with respect to the axis-normal contact faces. The gradient increases from one wave line portion $\phi_1$ to the next $\phi_2$ with an increasing distance from an original minimum or maximum.

With the help of the means mentioned here, the characteristic spring curve can be divided into portions of different spring rates. In adjoining portions of travel, the spring rate in the respective following portion of travel is greater than in the respective previous portion of travel, starting from the starting height h of the undulating washer or wave-shaped spring.

Thus, the heights of the individual portions of travel can be substantially freely selected by selecting the length and curvature of the individual wave line portions, and thus the changing of contact points. The same applies to the respective spring rates of the individual portions of travel which, substantially depend on the degree of curvature of the curved line of the individual wave line portions.

As a result of the shape of the wave line, the force introduction points change in a defined way during the increasing rate of shortening or compression of the undulating washer or wave-shaped spring (increasing travel). From a defined compression rate onwards, in accordance with the flattening and forcing into contact of a wave line portion, the free wave line length of the undulating washer or wave-shaped spring can be shortened in a defined way between the contact points (load introduction points) and thus, the spring rate can increase in a step-like manner.

In a preferred embodiment, the individual wave line portions can adjoin one another with narrow radii of transition.

In a further embodiment, it is proposed that there are provided at least two minima and two maxima across the circumference are provided within a total extension of the wave line. However, it is possible to freely select a larger number, such as six minima and six maxima.

In another preferred embodiment, the wave line can extend between the minima and the maxima so as to rise or fall monotonically.

The extension of the individual wave line portions can be selected such that the flattening of a wave line portion and the contact between a flattened wave line portion and a contact face can take place approximately simultaneously. At this point in time, the contact point of the undulating washer or wave-shaped spring can change from the original, or previous contact point, in a substantially stepwise manner to the end point of the wave line portion which had just been flattened. The same process can then be repeated with the next wave line portion which-begins having a new contact point that is still curved away from the contact face. Because of the shortened length of the free wave line regions between the contact points, flattening the wave line portion can require higher forces. This effect is due to the wave line portions being formed like unilaterally clamped-in, loaded bending beams. Thus, with an increasing load, such portions can bend to form a straight line, which is analogous to gradually removing a load from a bending beam which had previously been loaded by an individual load at its free end.

Undulating washers or wave-shaped springs in accordance with the invention are particularly suitable for being used as contact or damping springs for multi-plate couplings in automatic transmissions for motor vehicles. Because of the progressive characteristic spring rate, such wave-shaped springs do not suffer from adverse impact noise which used to occur in earlier spring types. Overall, the undulating washers or wave-shaped springs improve the comfort conditions during gear changing.

BRIEF DESCRIPTION OF THE DRAWINGS

FIG. 3 shows an inventive wave-shaped spring in the undeformed condition
  a) in a side view
  b) in a plan view.

FIG. 4 shows an inventive undulating washer or wave-shaped spring in different shortened stages (with different lifts)
  a) undeformed
  b) with a first spring travel $h_1$
  c) with a second spring travel $h_2$.

DETAILED DESCRIPTION

Figure 1:
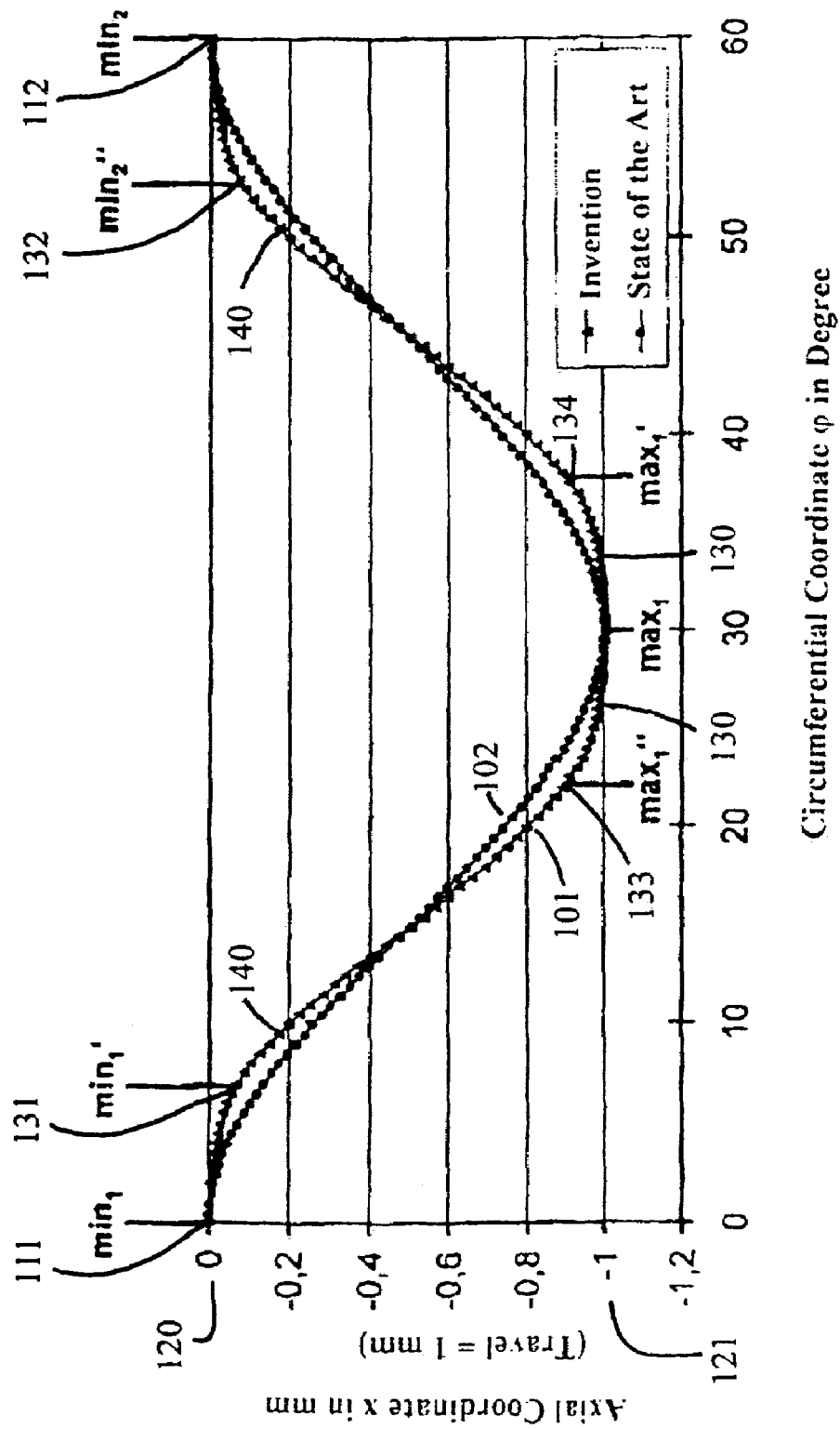
FIG. 1 shows the wave line of an inventive undulating washer or wave-shaped spring as compared to the wave line of a prior art undulating washer or wave-shaped spring according to their height coordinates and circumference coordinates.

FIG. 1 shows the wave line 101 of an inventive spring 100 as compared to the prior art wave line 102 of a prior art spring 110 with their height coordinates in a circumferential range of 360°/6 waves=60°. It can be seen that the two undulating washers or wave-shaped springs, each comprise six identical, adjoining circumferential wave line regions 100 over a total of 360°. The prior art undulating washer 110 or wave-shaped spring extends in a substantially cosine way across the circumferential wave line 110 range illustrated, with the minima $min_1$ and $min_2$ (111, 112) and a maximum $max_1$ (113) also being shown. The latter constitute contact points relative to contact faces which are axis-normal relative to the X-axis and which are positioned on level x=0 and x=−1 (120, 121). When the spring is axially shortened in the direction of the height coordinate x, the contact points (111, 112, 113) remain substantially unchanged in the case of a prior art spring 110, with the spring rate remaining substantially constant as a function of the travel path in the direction of the X-axis.

However, in the case of a wave line 101 of an inventive undulating washer 100 or wave-shaped spring 100, the wave line 101 is divided into different portions. The shape of the wave line in one portion corresponds to the bent line of a curved beam. Starting from the minima $min_1$ and $min_2$ (111, 112) as well as the maximum $max_1$, (113) deformation at a first spring rate $r_1$, takes place in the first wave line portions 130 up to the points $min_{1'}$, $min_{2'}$, $max_{1'}$, $max_{1''}$ (131, 132, 133, 134). In the adjoining second wave line portions 140, deformation takes place at a second high spring rate $r_2$. The transition from a first wave line portion 130 to a second wave line portion 140 is shown by the new contact points $min_{1'}$, $min_{2'''}$, $max_{1'}$, $max_{1''}$ (131, 132, 1233, 134) which make contact after the first wave line portions (130) is flattened. As a result, the circumferential distance of the contact-free wave line range between the effective contact points is shortened.

In addition, or in the alternative, the annular member can be provided with second wave line portions directly adjacent the first wave line portions, which second wave line portions have a steepened form compared to portions of a cosine wave.

Figure 2:
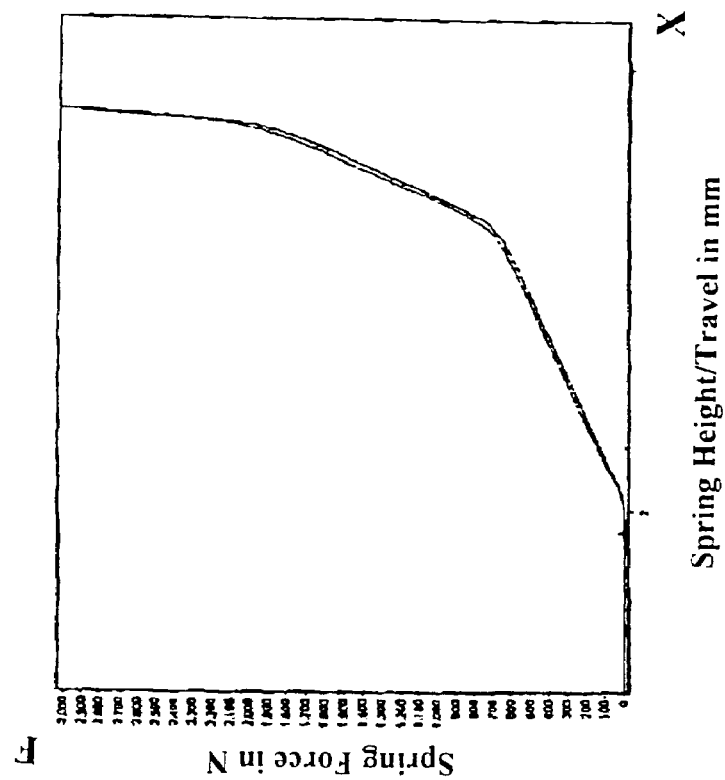
FIG. 2 shows the characteristic spring curve of an inventive undulating washer or wave-shaped spring
  a) calculated theoretically
  b) measured on an actual part.
Figure 2:
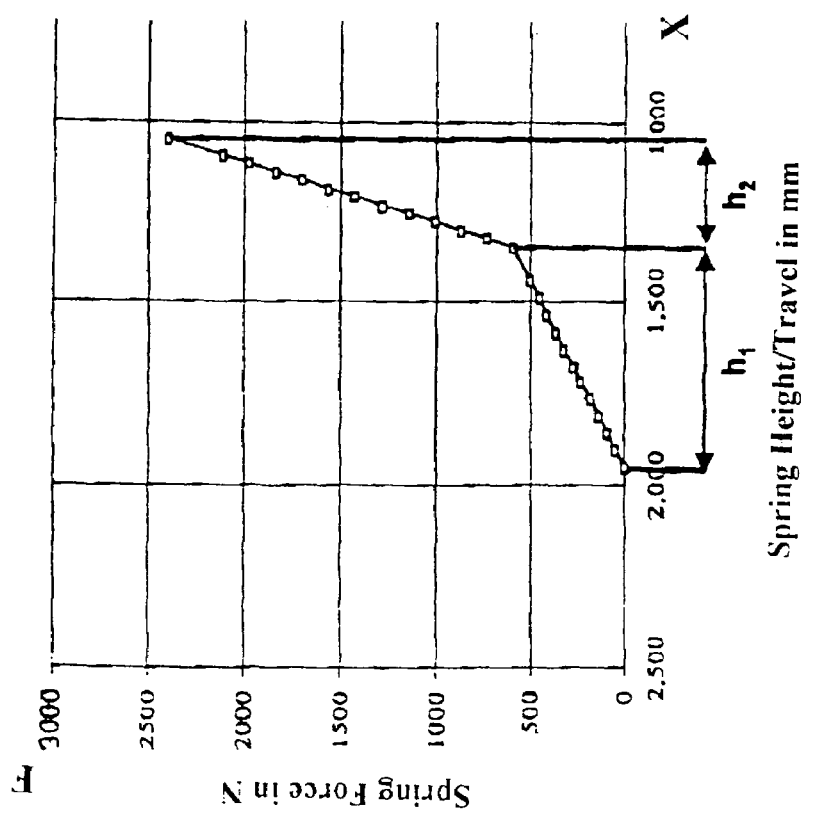

FIG. 2 shows the characteristic spring curve of an inventive undulating washer 100 or wave-shaped spring 100 whose curve extends in accordance with FIG. 1. In FIG. 2a and FIG. 2b the deformation forces F are shown as a function of the height coordinate x. Starting from FIG. 2b, the wave height h, a first shorted region (travel) $h_1$ is provided at a lower spring rate and an adjoining second shortened region (travel) $h_2$ occurs at a higher spring rate. FIG. 2a) shows the calculated theoretical characteristic curve and 2b) the measured characteristic curve of an actual part.

FIG. 3 shows an inventive undulating washer 100 or wave-shaped spring 100. FIG. 3b shows a plan view of a spring having the following parameters:

| | |
|---|---|
| $D_a$ | outer diameter |
| $D_m$ | mean diameter |
| $D_i$ | inner diameter |
| b | ring width. |

FIG. 3a shows a side view of a spring having the following parameters:

| | |
|---|---|
| b | ring width |
| t | ring thickness |
| $l_o$ | spring height |
| h | wave height. |

FIG. 4 once again shows the undulating washer 100 or wave-shaped spring 100 according to FIG. 3 in a side view FIG. 4a shows a spring in an undeformed condition FIG. 4b shows a spring during deformation by the axial travel $h_1$ in the first region of the characteristic curve and in illustration c) during deformation by the axial travel $h_1+h_2$, with $h_2$ being positioned in the second region of the characteristic curve.

Figure 5:
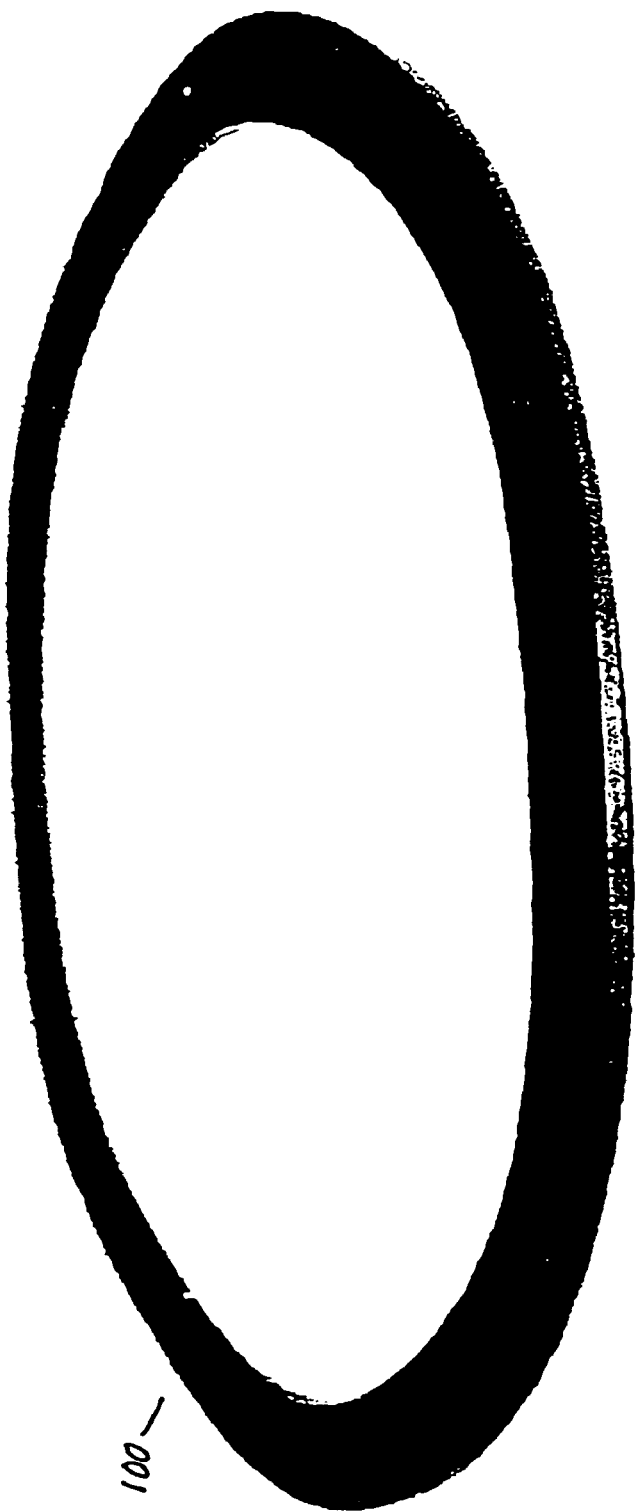
FIG. 5 shows an inventive undulating washer or wave-shaped spring in a 3D illustration.

FIG. 5 shows an inventive undulating 100 washer or wave-shaped spring 100 with a number of n=5 wave regions in a 3D illustration.

The invention claimed is:

1. An axially acting undulating washer or wave-shaped spring consisting of a closed annular member which comprises a central x-axis and which is periodically undulating across the circumference, wherein a wave line extends between a plurality of identical minima and identical maxima, said minima and maxima forming contact points relative to axis-normal contact faces in an unloaded state of the annular member, said annular member comprising first wave line portions starting from each minimum and maximum in each circumferential direction, which first wave line portions having a flattened form in an unloaded state compared to respective wave line portions at maxima and minima of a cosine wave,
   said annular member further comprising second wave line portions directly adjoining the first wave line portions, which second wave line portions having a steepened form compared to said cosine wave
   wherein, under an increasing axial load on the annular member, said first wave line portions are deformed at a first spring rate and flattened to contact the contact faces, and wherein, after flattening of the first wave line portions, said second wave line portions are deformed at a second spring rate which is higher than the first spring rate.

2. An undulating washer or wave-shaped spring according to claim 1, whereby said wave line is provided with a characteristic spring rate whereby the contact points discontinuously move away from the original minima and maxima with an increasing axial load.

3. An undulating washer or wave-shaped spring according to claim 1, whereby said first and second wave line portions have characteristic spring rates which correspond to the curved lines of bending beams loaded at their free ends by an individual load, wherein the curved lines of the individual wave line portions are based on individual loads which increase with an increasing distance from the original minima and maxima.

4. An undulating washer or wave-shaped spring according to claim 1, wherein the wave line has a characteristic spring curve whereby a compression in an x-axis direction under an increasing axial load at least two ranges of travel $h_1$, $h_2$ are provided adjacent one another, the at least two ranges of travel having spring rates $r_1$, $r_2$, wherein at least one of the at least two spring rates is greater than at least one other of the at least two spring rates with an increasing path of travel ($r_2 > r_1$).

5. An undulating washer or wave-shaped spring according to claim 4, wherein the wave line has a characteristic spring curve whereby at compression of the annular member in an X-axis direction a transition between a first and second range of the at least two ranges of travel is provided whereby under an increasing axial load, the contact points of the annular member relative to the contact faces discontinuously move away from the original minima and maxima.

6. An undulating washer or wave-shaped spring according to claim 1 wherein the annular member further comprises at least two wave line portions $\phi_1$, $\phi_2$ starting from each minimum and maximum and in each circumferential direction and which directly adjoin one another, wherein the first wave line portion $\phi_1$ has a first gradient that is less than a second gradient of the second wave line portion $\phi_2$ with an increasing distance from an original minimum or maximum.

7. An undulating washer or wave-shaped spring according to claim 1 further comprising at least one radii of transition, wherein the at least two wave line portions adjoin one another with the at least one radii of transition.

8. An undulating washer or wave-shaped spring according to claim 1 wherein there are provided at least two minima and two maxima in an entire wave line.

9. An undulating washer or wave-shaped spring according to claim 8, wherein there are provided six maxima and six minima in an entire wave line.

10. An undulating washer or wave-shaped spring according to claim 1 wherein the annular member comprises a constant width b and thickness t respectively across the circumference.

11. An undulating washer or wave-shaped spring according to claim 1 wherein on at least one side, the one side including an inside portion and an outside portion, the annular member comprises a toothing constituting anti-rotation means.

12. An undulating washer or wave-shaped spring according to claim 1 wherein the wave line monotonically rises and falls between the minima and the maxima.

* * * * *